July 29, 1969        F. W. MORLEY        3,457,853

CONTINUOUS HAMBURGER GRILL

Filed March 20, 1968        3 Sheets-Sheet 1

INVENTOR
FRED W. MORLEY

BY
Trask, Jenkins & Hanley
ATTORNEYS

July 29, 1969  F. W. MORLEY  3,457,853
CONTINUOUS HAMBURGER GRILL
Filed March 20, 1968  3 Sheets-Sheet 2

INVENTOR
FRED W. MORLEY
BY
Trask, Jenkins & Hanley
ATTORNEYS

July 29, 1969  F. W. MORLEY  3,457,853
CONTINUOUS HAMBURGER GRILL
Filed March 20, 1968  3 Sheets-Sheet 3
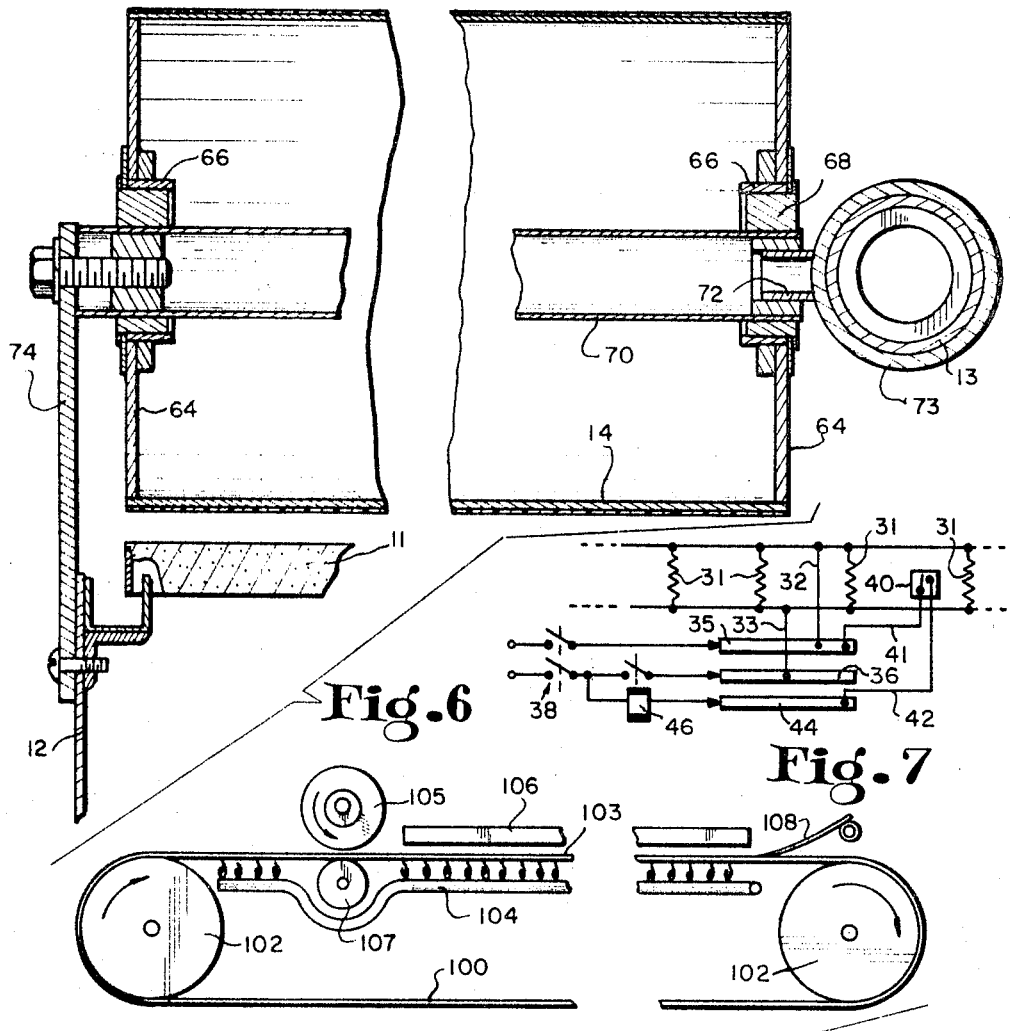
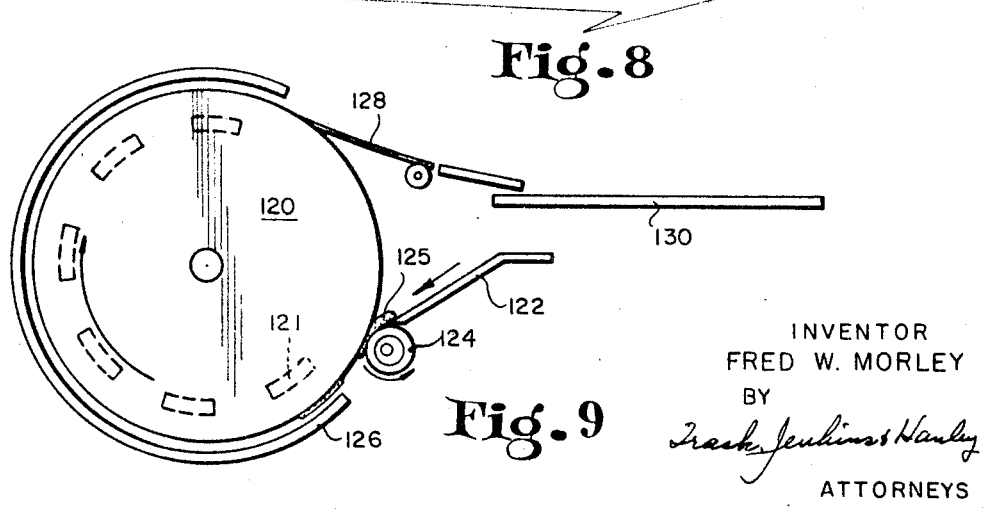
INVENTOR
FRED W. MORLEY
BY
Trask, Jenkins & Hanley
ATTORNEYS United States Patent Office 3,457,853
Patented July 29, 1969

3,457,853
CONTINUOUS HAMBURGER GRILL
Fred W. Morley, 4515 N. Meridian St.,
Indianapolis, Ind. 46208
Filed Mar. 20, 1968, Ser. No. 714,643
Int. Cl. A22c 7/00; A47j 37/06
U.S. Cl. 99—349
21 Claims

ABSTRACT OF THE DISCLOSURE

A device for cooking hamburgers comprising a heated metal cooking element in the form of a disk, belt, or drum of carbon steel or other metal to which hamburger will adhere, power driven to move progressively past a loading station, through a cooking zone and past a discharge station. Raw patties are placed on the cooking element at the loading station, then pass beneath a roller which presses the patties firmly into adhering engagement with the heated cooking element, and are cooked, primarily by conduction, as they travel through the cooking zone. At the discharge station, a sharp blade cuts the cooked patties from the cooking element. The cooking zone is desirably enclosed, to aid in cooking and reduce moisture loss, and additional heat may be supplied to the opposite side of the patties to hasten cooking.

---

In the commonly practiced manner of commercially preparing hamburgers, raw meat patties are prepared in advance and stored for use. During such storage, the patties acquire a body which renders them tough unless they are freshly re-worked immediately before cooking. When a pattie is to be cooked in accordance with common practice, it is placed upon a heated surface, remains on the heated surface, perhaps being turned over, until cooking is complete. During the cooking, heat is transmitted to the pattie in part by convection through a thin layer of grease and in part by radiation; and in this process many of the juices in the meat evaporate and the pattie shrinks in size. Both the shrinkage and the evaporation are undesirable.

This invention relates to a hamburger cooking apparatus in which the shrinkage and evaporation above referred to is eliminated or greatly reduced, with which the cooking requires less attention from the cook, and which operates automatically to re-work the meat, to produce uniformly-cooked and flavorful patties, and to free them from the cooking surface.

In accordance with the invention the cooking is done on a heated metal surface of steel or other metal of a character to which the pattie will stick when pressed against the surface. When a pattie is applied to such surface, it is immediately moved beneath a roller which reworks the meat and reduces it to uniform thickness, and presses the pattie into adhereing contact with the surface. The pattie sticks to the surface and is carried by the surface through a cooking zone where it is cooked, principally by conduction directly from the surface to which it is stuck. The cooked pattie is then cut from the surface by a blade. The cooking zone is desirably enclosed by a shroud to aid in complete cooking and to retain moisture. Radiant or other additional heat may be applied to the opposite side of the pattie to hasten the cooking process.

In a preferred apparatus embodying the invention a metal disk is mounted for rotation about a vertical axis and carries on its lower surface a series of electrical-resistance heating elements to maintain it at a set cooking temperature. Power driven means rotates the disk continuously at a set speed through a receiving area, a cooking zone, and a discharge station. Immediately beyond the receiving station in the direction of disk rotation, a roller is mounted above the disk to compress the patties passing it sufficiently to re-work the meat, and to press such patties into adhering or sticking engagement with the cooking surface of the disk. At the discharge station, the cooking surface moves slidably beneath a sharp cutter blade which severs the bond between cooked patties and disc surface and lifts the patties from the disk. Preferably, the roller is adjustable to vary the distance between it and the disk surface, and the scraping means is also adjustable to vary the pressure with which it engages the disk surface.

Another form of the invention embodies a metal belt having a horizontal stretch extending past the receiving and discharge stations. A roller adjacent the receiving station and a blade at the discharge station function in the same way as the corresponding elements described above.

In still a third embodiment of the invention, the cooking surface is the surface of a drum mounted on a horizontal axis, and the hamburger patties are cooked on the outer surface of the drum, being pressed against and stuck to such surface by a roller adjacent the receiving station and cut from the surface by a blade at the discharge station.

In all the illustrative embodiments just referred to, a heat-reflecting shroud preferably extends over the cooking zone from adjacent the receiving to adjacent the discharge station, in spaced relation to the patties on the moving cooking element. Such a heat-reflecting shroud can function not only to aid in cooking the top surfaces of the cooking patties but also to enclose the cooking space and thereby impede the evaporation of meat juices. The shroud may contain additional heating means to hasten the cooking.

Other features of the invention will become apparent from the following more detailed description of the specific embodiment of the invention shown in the accompanying drawings. In such drawings:

FIG. 6 is a section axially of the roller taken on the line 6—6 of FIG. 4;

FIG. 7 is a wiring diagram for the apparatus of FIGS. 1–6;

FIG. 8 is a somewhat diagrammatic side elevation of a cooking apparatus in which the cooking surface is on a moving belt; and FIG. 9 is a somewhat diagrammatic elevational view of a cooking apparatus in which the cooking surface is the outer surface of a drum.

Figure 1:
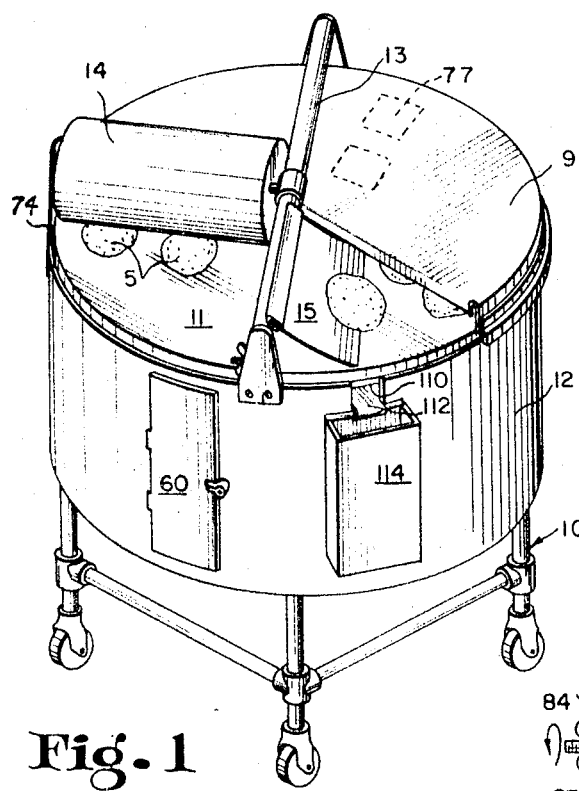
FIG. 1 is an isometric view of a cooking apparatus in accordance with the invention and in which the cooking surface is on a rotating disk.

In the form of apparatus shown in FIGS. 1–6, there is provided a base structure 10 supporting a cooking element in the form of a disk 11 mounted for rotation on a vertical axis. A housing 12, conveniently of sheet metal, encloses the mounting and drive for the disk 11 and supports the pattie roller 14, the cooking-zone shroud 9, and the cutter blade 15. Extending more or less diametrically across and above the disk is a bar 13 which supports the inner end of a pattie-compressing roller 14 and forms a mounting for the cutter blade 15, spaced at about a 90° interval from the roller. The exposed portion of the disk 11 between the blade 15 and the roller 14 provides a loading station, and the blade locates the discharge station.

Figure 3:
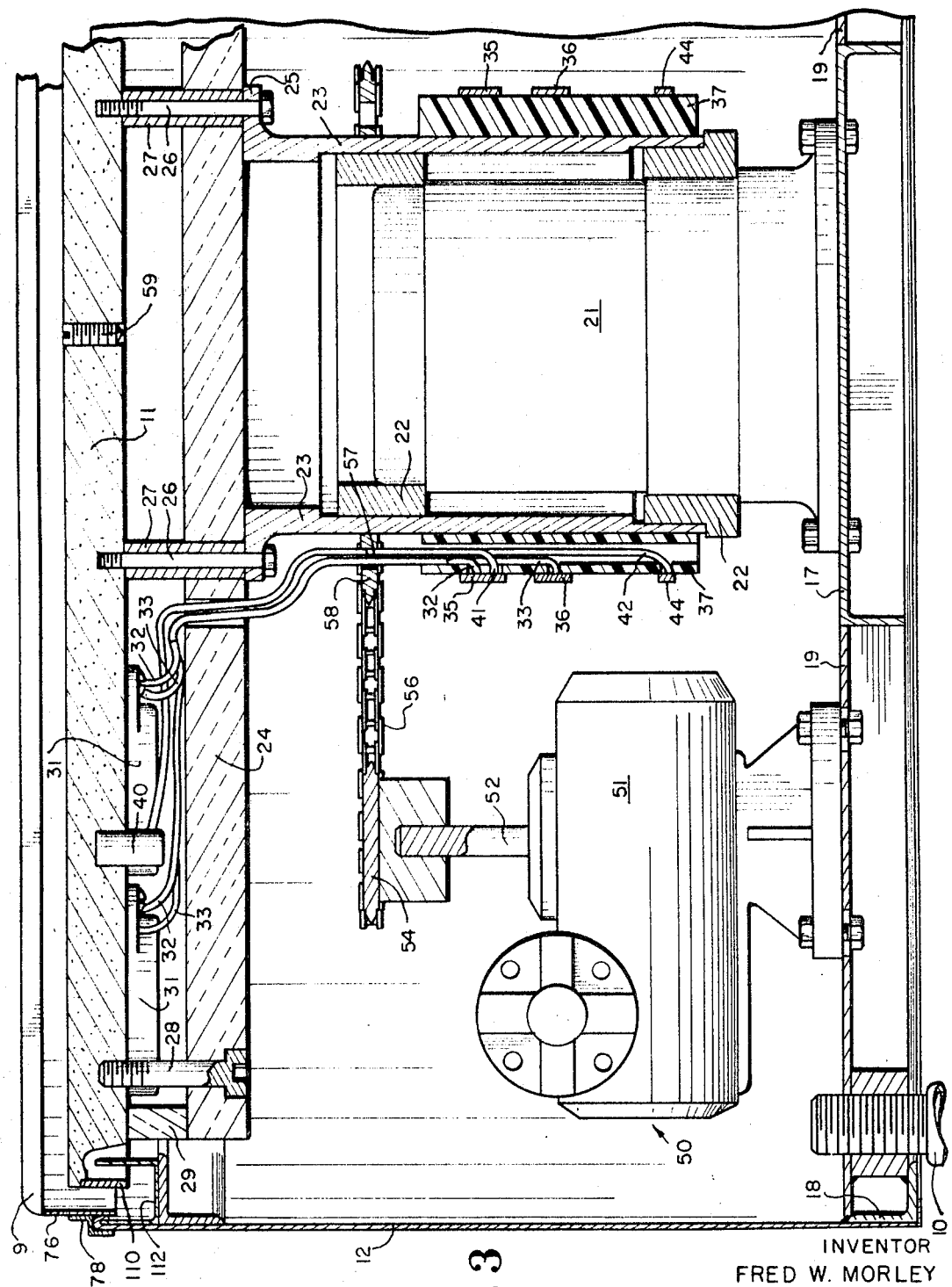
FIG. 3 is a partial vertical section on the line 3—3 of FIG. 2.

Referring now to FIG. 3 the base 10 of the apparatus comprises a crossmember 17 extending diametrically across an angle-iron ring 18 locked within and secured to the lower portion of the housing 12. Additional frame members 19 extend radially from the member 17 to the ring 18. At the middle of the crossmember 17 is an upwardly projecting stud shaft 21 carrying near its upper and lower ends bearing rings 22 upon which a tubular hub 23 is rotatably mounted. On the upper end of the hub 23, there is a disk 24 of heat-insulating material, and above and spaced from the disk 24 is the cooking disk 11. Conveniently, the hub 23 is provided at its upper end with an outward extending annular flange 25 which receives screws 26 extending through sleeves 27 and entering the cooking disk 11. The sleeves 27 extend through holes in the insulating disk 24, and their ends abut against the lower surface of the cooking disk 11 and the upper face of the flange 24. Near the periphery of the two disks 11 and 24 additional screws 28 may be provided to interconnect the two disks and clamp between them a ring 29 of heat-insulating material.

The cooking disk 11 is preferably a heavy disk of carbon steel, for that material provides the desired characteristic that hamburger patties adhere tightly to it for conduction cooking. Aluminum may also be used, but is subject to greater wear. Cast iron is not suitable because hamburger does not stick to it.

The outer edge of the disk is desirably provided with a depending skirt 110, preferably of stainless steel, from which grease will drip without running inward over the bottom surface of the disk. As shown, such skirt is attached to the disk at the outer edge of a groove. An annular trough 112 is formed at the upper edge of the housing 12, beneath the drip-edge 110, to catch grease dripping therefrom. The trough leads to a spout from which the grease drains to a container 114 removably hung on the housing 12.

Heating elements are secured to or cast into the lower surface of the cooking disk 11 in a pattern to evenly heat the top conduction surface. As shown, there are two annular series of electrical-resistance heating elements 31 secured to the disk by suitable clamps. These are supplied in parallel with current through wires 32 and 33 extending through an opening in the insulating disk 24 to collector rings 35 and 36 mounted on a cylinder of insulation 37 on the hub 23. Brushes, shown diagrammatically in FIG. 7, engage the collector rings 35 and 36, and are connected through a double pole switch 38 to a pair of supply wires.

Desirably, the temperature of the cooking disk 11 is automatically controlled through a thermostatic switch 40 (or a pair of such switches in series) secured to such disk. As shown in the wiring diagram, in FIG. 7, one wire 41 from the switch 40 is connected to the collector ring 35 and the other wire 42 is connected through a third collector ring 44 to the coil of a relay 46 controlling a switch in the supply wire to the collector ring 36. The thermostatic switch 40 will thus control the relay to energize and deenergize the heating-coil circuit to regulate the cooking temperature.

Supported from the base frame is a means, designated in its entirety by the reference numeral 50, for rotating the hub 23 and the disks 11 and 24 about their common axis. Conveniently, such means may include an appropriate electric motor (not shown), a speed-reducing drive 51 and an output shaft 52 carrying a sprocket 54 connected through a chain 56 to a second sprocket 58 secured to the hub 23. The drive may be either a fixed or a variable speed drive. The sprocket 58 has holes 57 through it to pass the wires. To afford access to the driving mechanism and to the brushes which cooperate with the collector rings 35 and 36, the housing 12 is provided with an opening which is normally closed by a removable cover 60 (FIG. 1). By working through such opening, the chain 56 can be removed, the brushes disengaged from the collector rings, and the unit comprised of the disks 11 and 24, the hub 23 and the collector rings lifted vertically from the housing for purposes of replacement or repair. As shown, the cooking disk 11 is provided at its center with a screw-threaded opening normally receiving a screw 59 which can be removed to permit insertion of an eye-bolt (not shown) to which a hoist can be attached for lifting the assembly from the housing 12.

Figure 4:
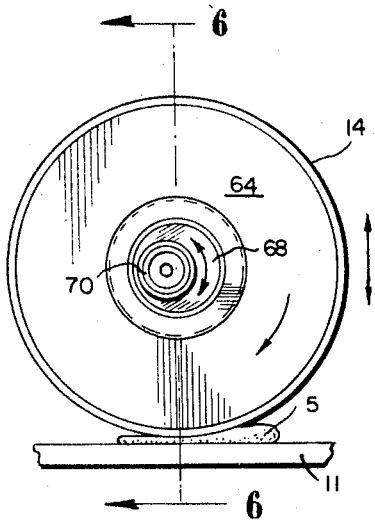
FIG. 4 is an elevation of the pattie-compressing roller.
Figure 5:
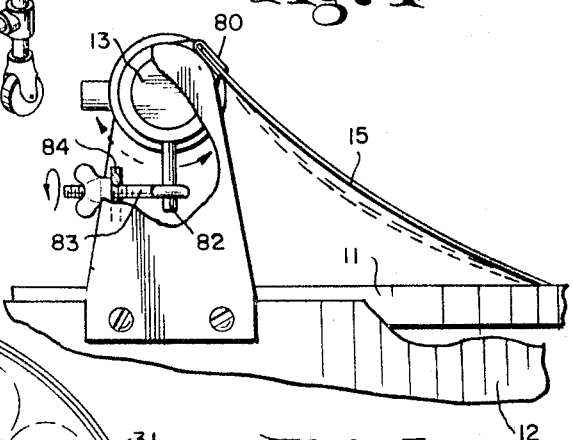
FIG. 5 is an elevational view of the cutter blade and its mounting at the discharge station.

As shown by FIGS. 1, 4 and 6, the roller 14 comprises a cylindrical drum covered with a layer of synthetic plastic material to which the meat will not adhere, such as "Teflon;" and closed at its ends by end plates 64 containing concentric bearing sleeves 66. The roller is mounted by such bearing sleeves 66 on bearings 68 fixed eccentrically on a support shaft 70. The inner end of such support shaft 70 is rotatably received on a stud 72 carried by a collar 73 on the cross bar 13; and its outer end is adjustably fixed to an upstanding bracket 74 supported from the wall of the housing 12. By reason of the eccentric position of the bearings 68 on the shaft 70, the height of the roller 14 can be adjusted by rotating the shaft 70.

The shroud 9 comprises a flat plate of semicircular shape having a down-turned outer edge 76 provided with a collar 78 to define a downward-open groove which is received over the top edge of the side wall of the housing 12. A down-turned flange at the straight edge of the shroud 9 serves to stiffen that edge. The shroud may be supported at the center by the bar 13, but ordinarily I find this unnecessary. If desired, the lower face of the shroud 9 may be provided with one or more radiant heaters 77, shown in dotted lines in FIG. 1, to aid in cooking the top surfaces of the hamburger patties and to increase the overall speed of operation of the apparatus.

The cutter blade 15 comprises a resilient thin steel plate which is sharpened on both edges. In use, its upper edge is removably received in a slot between the walls of a deep channel member 80 fixed to the bar 13, which forms the mounting for the blade 15 and is rotatable about its axis. A pin 82 projects downward from the bar 13 into the eye of an eye-bolt 83 extending through a bracket 84 on the adjacent end support of the bar 13. By tightening a thumb nut on the eye-bolt 83, the pin 82 is pulled clockwise (in FIG. 5) to bend the blade 15 and press its free edge downward against the cooking disk 11 with an adjustable pressure, sufficient to cause the sharp free edge of the blade to cut cooked hamburger patties from that plate 11. When the one edge of the blade gets dull, the blade can be reversed to utilize its opposite sharpened edge.

Figure 2:
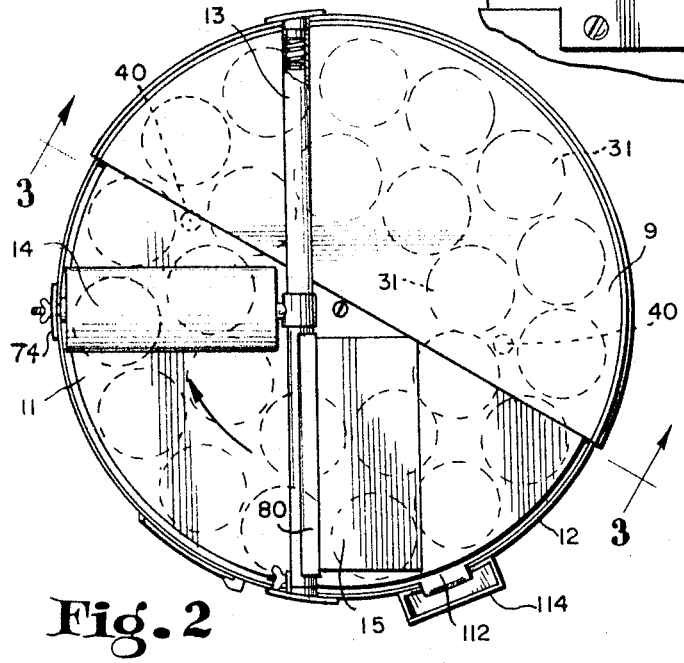
FIG. 2 is a plan view of the apparatus shown in FIG. 1.

From FIG. 2 it will be noted that the free edge of the blade 15 lies chordally with respect to the cooking disc 11 and at an angle to sweep grease on the disk to the outside, and that the grease trough 112 is disposed adjacent the outer end of that free edge.

OPERATION, FIGS. 1–6

In operation of the device described above, hamburger patties are laid on the cooking disk 11 in the loading station between the cutter blade 15 and the roller 14. The disk rotates clockwise in FIG. 1, at a set speed of say from 0.5 to 2.0 revolutions per minute, preferably 1.0 r.p.m., and carries the patties 5 under the roller 14. As prepared, the patties are thicker than desired and may be about ¼ inch thick. As they pass under the roller 14 they are substantially compressed, say to 3/16 inch in thickness. Such compression loosens the texture of the meat and breaks up the body which would otherwise tend to make the hamburger patties tough. The roller 14 also serves to press the patties tightly against the cooking plate 11, which is of such character that the patties stick to it. They remain stuck to the cooking disk 11 as they travel through the cooking zone beneath the shroud 9. The plate 11 is maintained at cooking temperature by the thermostatically controlled heaters 31, and the temperature is such that by the time the patties reach the knife 15 at the discharge station, they are well cooked with a nicely browned bottom surface, still stuck to the plate 11, and completely cooked throughout. They are then cut free from the cooking surface of the disk 11 by the blade 15 and ride up onto the top surface of the blade 15, from where they are removed.

The hamburger patties are made from fairly lean meat, and when they are pressed against the plate 11 to a thickness of approximately 3/16 inch, they are cooked within about 50 seconds to nicely browned and flavorable hamburgers. Continuous production will produce cooked hamburgers at a rate of about one every three or four seconds, depending on pattie size, and this speed of production eliminates any need to cook a reserve supply, and permits each hamburger to be freshly cooked. The hamburgers are uniform in character and quality and none are too rare and none too well done, and their quality is not dependent upon the attention given by the cook. Because the hamburger patties are stuck to the cooking surface throughout their cooking period, there is substantially no shrinkage in area. The direct conduction heating, combined with the enclosed cooking zone beneath the shroud 9, serves to produce complete cooking of a flavorable product with minimium loss of moisture and the natural juices of the meat.

MODIFICATION OF FIG. 8

The modification shown in FIG. 8 comprises a metal belt 100 stretched about two drums 102 and with a top horizontal stretch 103 traveling over a gas heater 104 beneath a roller 105 and a shroud 106. Immediately below the roller 105, the belt is supported by a support roller 107. A cutter blade 108 rides on the belt 100 beyond the exit from the shroud 106.

Operation of this modification is similar to that of the above described modification. Hamburgers are placed on the belt at the loading zone to the left of the roller 105, and are carried by the belt beneath the roller 105 which compresses them and presses them into sticking engagement with the surface of the belt 100. They are then carried beneath the shroud 106 where cooking occurs, and are cut from the belt by the blade 108 at the discharge station beyond the exit edge of the shroud 106.

MODIFICATION OF FIG. 9

In the modification shown in FIG. 9, the cooking element comprises a drum 120 providing a cylindrical cooking surface and mounted for rotation on a horizontal axis. A feed station is provided by a chute 122 which delivers hamburger patties 125 between the surface of the drum 120 and a pressure roller 124. The roller 124 compresses the patties 125 and presses them into sticking engagement with the cooking surface of the drum 120. The patties are then carried by such cooking surface through a cooking zone beneath a shroud 126, and are scraped from the surface of the drum by a cutter blade 128 at the exit from the shroud 126. From the blade 128 the patties are delivered to a receiving table 130. The cooking surface of the drum 120 is heated by heaters 121 disposed in heating relationship with the inner surface of the outer wall of the drum, either in radiant heating relation or mounted on the drum and energized through collector rings in a manner similar to that shown in FIG. 3.

Operation of this modification is the same as in the other modifications. Because the patties 125 are stuck to the cooking surface, it is feasible to use a horizontally-mounted drum 120 and rely on the adhesion of the patties 125 to the cooking surface to carry them upside down, about the periphery of the rotating drum 120.

I claim:

1. Apparatus for cooking hamburgers, comprising a movably mounted cooking element having an extended cooking surface of a material to which hamburgers will stick, power-operated means for moving said element progressively from a receiving station, through a cooking zone and to a discharge station, heating means for maintaining said element at cooking temperature, means adjacent the receiving station for compressing to a predetermined uniform thickness raw meat patties placed on the cooking surface at the receiving station and for pressing such patties into sticking engagement with the cooking surface over the entire bottom area of the patties, said cooking element being operative to carry such patties through the cooking zone in pressure-free stuck engagement with the cooking surface for cooking by conduction from such surface, and knife means at the discharge station for cutting the cooked patties from the cooking surface.

2. Apparatus according to claim 1 wherein said means for compressing and pressing the patties comprises a roller, said roller having a mounting which is adjustable to vary the distance between the roller and the cooking surface.

3. Apparatus according to claim 1 wherein said means for compressing and pressing the patties comprises a roller.

4. Apparatus according to claim 1 wherein said cooking element is a continuously rotating disk one face of which is the cooking surface.

5. Apparatus according to claim 4 in which the disk has a cooking surface of steel.

6. Apparatus according to claim 1 wherein said cooking element is a belt.

7. Apparatus according to claim 1 wherein said cooking element is a rotatable drum the outer surface of which is the cooking surface.

8. Apparatus according to claim 1 with the addition of a shroud extending in spaced relation to cooking patties substantially from the receiving station to the discharge station.

9. Apparatus according to claim 1 with the addition that said cutting means includes a sharp-edged blade and a mounting therefor, said blade being freely removable from said mounting.

10. Apparatus according to claim 9 wherein said mounting is adjustable to vary the pressure exerted on the cooking surface by the blade.

11. Cooking apparatus, comprising:
   a cooking disk mounted for rotation in a substantially horizontal plane and having a top cooking surface of a material to which the meat will stick for heating by conduction,
   drive means for continuously rotating the disk,
   means for heating the disk to maintain its cooking surface at cooking temperature,
   a loading station for loading meat portions onto the cooking surafce,
   means immediately beyond such loading station for momentarily pressing the meat portion into sticking contact with the cooking surface over their entire bottom area, said pressing means being operative at a limited portion of the path of travel of the cooking surface and the cooking disk being operative to carry the pressed meat portions beyond such limited path portion in pressure-free stuck engagement with such surface for cooking by conduction from such surface,
   a discharge station and a cutting blade at such station and riding on the cooking surface for cutting cooked meat from such surface,
   the discharge station being spaced from said pressing means in the direction of surface movement a distance such that, at the temperature of the surface and its rate of travel, meat of predetermined thickness in such pressure-free stuck engagement with such surface will be cooked when it is cut from the surface at the discharge station.

12. Cooking apparatus according to claim 11 in which the pressing means is a roller disposed radially above the disk.

13. Cooking apparatus according to claim 11, with the addition of a shroud extending in spaced relation with the cooking surface over a substantial portion of its path of movement from the loading station to the discharge station.

14. Cooking apparatus according to claim 13, with the addition of heating means in the shroud to heat the top side of meat carried by the cooking surface.

15. Cooking apparatus according to claim 11, with the addition of heating means to heat the top side of meat carried by the cooking surface between the loading and discharge stations.

16. Cooking apparatus according to claim 11 in which the cooking surface of the disk is of steel.

17. Cooking apparatus according to claim 11 in which:
said disk is carried by a hub rotatably supported on a vertical axis,
a drive member on the hub and driving means connected to drive the same,
heating elements clamped in conductive relation against the under surface of the disk for heating the same,
a thermostatic control element carried with the disk and responsive to its temperature,
means for energizing said heating elements, including a plurality of power supply collector rings rotatable with the hub,
a switch in the circuit to said power supply rings, and an additional collector ring connecting said control element to actuate said switch.

18. Cooking apparatus according to claim 11 in which said cutting blade comprises a wide blade having a sharpened edge, means to hold such edge against the cooking surface under pressure, with the blade edge disposed chordally with respect to the cooking disk and at an angle to sweep grease on the disk toward the outside thereof.

19. Cooking apparatus according to claim 18 with the addition of a grease trough disposed at the periphery of the disk adjacent the outer end of said chordally-disposed blade edge.

20. Cooking apparatus, comprising:
a cooking disk mounted for rotation and having a cooking surface at one face thereof,
drive means for rotating the disk,
a wide cutting blade having an edge which rides on the cooking surface and is sharpened for cutting from the cooking surface meat adhering thereto,
a blade mounting disposed above the cooking surface and having mounting means for gripping engagement with the blade along a line widely spaced from said sharpened edge,
said mounting being rotatable about an axis parallel to said engagement line for pressing said blade edge into tight engagement with the cooking surface, and
adjustment means to hold said mounting in rotated position.

21. Cooking apparatus as in claim 20 in which:
the blade is a resilient wide blade having opposite sharpened edges, and
said blade mounting comprises a mounting bar provided with a deep slot in which one of said edges is received while the other rides on the cooking surface,
the rotation of the mounting causing such one edge to be gripped in the slot and bent in a direction to flex the blade and thereby resiliently press the other edge into tight engagement with the cooking surface.

References Cited
UNITED STATES PATENTS

| | | | |
|---|---|---|---|
| 1,471,727 | 10/1923 | Gomez | 99—423 XR |
| 1,621,234 | 3/1927 | Carpenter | 99—373 XR |
| 1,881,126 | 10/1932 | Parr | 99—353 |
| 2,907,267 | 10/1959 | Lindsey | 99—339 |
| 3,012,496 | 12/1961 | Kelley et al. | 99—423 |
| 3,058,434 | 10/1962 | De Jersey | 107—57 |
| 3,291,036 | 12/1966 | Perl | 99—373 XR |
| 3,379,141 | 4/1968 | Groth | 107—548.28 XR |
| 3,380,377 | 4/1968 | Alexander | 99—349 XR |

WILLIAM I. PRICE, Primary Examiner

A. O. HENDERSON, Assistant Examiner

U.S. Cl. X.R.

99—353, 423